United States Patent
Lin et al.

(10) Patent No.: US 7,589,983 B1
(45) Date of Patent: Sep. 15, 2009

(54) POWER CONVERTER CONTROLLER CONTROLLED BY VARIABLE REFERENCE VOLTAGE GENERATED BY DUAL OUTPUT DIGITAL TO ANALOG CONVERTER

(75) Inventors: Allan Ming-Lun Lin, Pleasanton, CA (US); Mark Dean Eason, Hollister, CA (US); Mark Robert Muegge, Cupertino, CA (US)

(73) Assignee: iWatt Inc., Los Gatos, CA (US)

( * ) Notice: Subject to any disclaimer, the term of this patent is extended or adjusted under 35 U.S.C. 154(b) by 402 days.

(21) Appl. No.: 11/557,953

(22) Filed: Nov. 8, 2006

Related U.S. Application Data

(60) Provisional application No. 60/735,522, filed on Nov. 10, 2005.

(51) Int. Cl.
*H02M 3/335* (2006.01)
*H03H 1/00* (2006.01)
(52) U.S. Cl. .................................. 363/21.13; 323/367
(58) Field of Classification Search .............. 363/21.13, 363/56.11; 323/367
See application file for complete search history.

(56) References Cited

U.S. PATENT DOCUMENTS

| | | | |
|---|---|---|---|
| 6,061,257 A * | 5/2000 | Spampinato et al. ..... | 363/21.13 |
| 6,166,927 A | 12/2000 | Farrington et al. | |
| 6,169,660 B1 | 1/2001 | Matsui et al. | |
| 6,331,768 B1 | 12/2001 | Drori et al. | |
| 6,555,996 B2 | 4/2003 | Drori et al. | |
| 6,657,499 B2 | 12/2003 | Lin | |
| 6,760,203 B2 | 7/2004 | Usui | |
| 6,944,034 B1 | 9/2005 | Shteynberg et al. | |
| 6,956,750 B1 | 10/2005 | Eason et al. | |
| 6,990,000 B1 | 1/2006 | Rodriguez et al. | |
| 7,061,780 B2 * | 6/2006 | Yang et al. ............... | 363/21.16 |
| 7,250,745 B2 | 7/2007 | Yasukouchi et al. | |
| 7,362,593 B2 | 4/2008 | Yang et al. | |
| 7,443,700 B2 | 10/2008 | Yan et al. | |
| 2008/0067994 A1 | 3/2008 | Kesterson et al. | |

* cited by examiner

*Primary Examiner*—Shawn Riley
(74) *Attorney, Agent, or Firm*—Fenwick & West LLP

(57) ABSTRACT

A power converter includes a switch controller having a dual output digital-to-analog converter for generating a variable reference voltage and a knee voltage offset from the reference voltage by a predetermined voltage. The variable reference voltage is generated based on a reconstructed representation of output voltage of the power converter in a previous switching cycle. Comparators compare the variable reference voltage and the variable knee voltage to a sensed output of the power converter in a first switching cycle. A digital logic of the switch controller receives signals from the comparators and determines a pulse signal for controlling an on-time and an off time of a switch in a second switching cycle.

20 Claims, 5 Drawing Sheets

US 7,589,983 B1

POWER CONVERTER CONTROLLER CONTROLLED BY VARIABLE REFERENCE VOLTAGE GENERATED BY DUAL OUTPUT DIGITAL TO ANALOG CONVERTER

CROSS-REFERENCE TO RELATED APPLICATION

This application claims priority under 35 U.S.C. § 119(e) to U.S. Provisional Patent Application No. 60/735,522 entitled "Digital Off-Line Low-Power Supply Controller," filed on Nov. 10, 2005, the subject matter of which is incorporated by reference herein in its entirety. This application is also related to U.S. Pat. No. 6,956,750 issued on Oct. 18, 2005 to Eason et al., entitled "Power Converter Controller Having Event Generator for Detection of Events and Generation of Digital Error," and to U.S. Pat. No. 6,990,000 issued on Jan. 24, 2006 to Rodriguez et al., entitled "Reconstruction of the Output Voltage of an AC-DC Power Converter."

BACKGROUND OF THE INVENTION

1. Field of the Invention

The present invention relates generally to a power converter, and more specifically, to a power converter controller having a switch controller operating with a variable reference voltage.

2. Description of the Related Art

Power converters typically require error circuitry that provides an "error" signal between the output voltage of the power converter and a reference voltage, in order to regulate the output voltage. The error circuitry should provide a magnitude and a sign (positive or negative) of the output voltage relative to a reference voltage, so that the power converter can use such error signal to properly regulate the output voltage by increasing or decreasing the amount of power delivered to the output of the power converter in response to such error signal.

Conventional power converters typically generate an error signal by sensing the output voltage as an analog value, deriving the difference between the sensed output voltage and the reference voltage as an analog value and amplifying it. Conventional power converters may also use an analog-to-digital converter (A/D converter) to generate the error signal depending upon the control scheme. Other conventional power converters may use analog error amplifiers to generate the error signal.

In conventional switching power converters, a reference voltage compared with the sensed output voltage is generally fixed to a chosen voltage so that the output voltage of the power converter is regulated to a target level. Some power converters generate another reference voltage that is sometimes referred to as a "knee voltage" that is generally lower than the reference voltage. Such reference voltage and knee voltage of a preceding switching cycle may be compared with the sensed output voltage to generate a pulse signal in the next switching cycle.

By fixing the reference voltage and the knee voltage, however, it may be difficult to obtain a stable and robust regulation of the output voltage of the power converter. During certain switching cycles of the power converter, the sensed output voltage of the power converter may fluctuate well above or below the fixed reference voltage and the fixed knee voltage. For example, during the startup of the power converter or during under-regulation, the output voltage of the power converter may stay below the fixed reference voltage or the fixed knee voltage. Conversely, when the power converter is over-regulated, the sensed output voltage of the power converter may rise well above the fixed reference voltage. In such cases, the fixed reference voltage and the fixed knee voltage may no longer be used to determine the proper on-time and off-time of the pulse signal of the power converter in the next switching cycle.

FIG. 4 is a diagram showing the waveforms of the sensed output voltage $V_{sense}$ of the power converter sampled in the first switching cycle relative to a fixed reference voltage and a fixed knee voltage in a conventional power converter. In the conventional power converter, the reference voltage $V_{REG}$ and the knee voltage $V_{knee}$ have fixed values. Therefore, unless the sampled output voltage $V_{sense}$ falls within a range defined by the reference voltage $V_{REG}$ and the knee voltage $V_{knee}$ as shown by $V_{sense}$ 410 in FIG. 4, a proper pulse signal for the second switching cycle cannot be generated from the reference voltage $V_{REG}$ and the knee voltage $V_{knee}$. For example, at the startup of the power converter or when the power converter is under-regulated, the sensed output voltage $V_{sense}$ 408 of FIG. 4 may rise above the knee voltage $V_{knee}$ at $T_{KR0}$ but stay below the fixed reference voltage $V_{REG}$. In this example, the events of the sensed output voltage $V_{sense}$ 408 rising above the reference voltage $V_{REG}$ and dropping below $V_{REG}$ are not detected. Under a more extreme case of under-regulation, $V_{sense}$ may stay below the knee voltage $V_{knee}$ so that even the events of $V_{sense}$ rising above or dropping below the knee voltage $V_{knee}$ may not be detected. Therefore, conventional power converters must use different algorithms depending on the levels of $V_{sense}$ and available events to determine the pulse signal for the second switching cycle when $V_{REG}$ and $V_{knee}$ cannot be used. Moreover, $V_{sense}$ 408 may oscillate after the initial spike, dropping below the knee voltage $V_{knee}$ for the first time at $T_{KD0}$. Because the oscillation of $V_{sense}$ 408 can be random, the event of $V_{sense}$ dropping below the knee voltage $V_{knee}$ may not be meaningful for controlling the power converter. Therefore, the conventional power converters using the fixed reference voltage $V_{REG}$ and the knee voltage $V_{knee}$ is less stable and robust than desired.

Therefore, there is a need for a power converter that can consistently and robustly control its output voltage by varying the reference voltage. There is also a need for a power converter that can generate a knee voltage having a fixed voltage offset from the reference voltage regardless of the variations in the reference voltage.

SUMMARY OF INVENTION

An embodiment of the present invention provides a switching power converter with a variable reference voltage that is adjustable based on a fixed reference voltage and a reconstructed representation of the output voltage delivered to the load in a switching cycle prior to a second switching cycle subsequent to a first switching cycle. The switch controller may compare a sampled representation of the output voltage of the power converter to the variable reference voltage to generate a pulse signal controlling an on-time and an off-time of the switch in a subsequent switching cycle. In an embodiment of the present invention, the switch controller includes a feedback voltage generator generating a reconstructed representation of the output voltage delivered to the load in the prior switching cycle.

In an embodiment of the present invention, the switch controller may also generate a "knee" voltage offset from the variable reference voltage by a predetermined offset voltage. The predetermined offset voltage may be a fixed value and not vary in accordance with changes in the representation of output voltage of the power converter. The knee voltage may be used in conjunction with the variable reference voltage to generate the pulse signal.

The switch controller may also include a digital-to-analog converter (DAC) to generate the variable reference voltage and the variable knee voltage. The DAC receives a reconstructed representation of the output voltage in the prior switching cycle from the feedback voltage generator and in response generates the variable reference voltage and the knee voltage based on the reconstructed representation of the output voltage and a fixed reference voltage. Signal inputs of the DAC are selected by the reconstructed representation of the output voltage to output the variable reference voltage and the variable knee voltage. Although the DAC of the embodiment was used in the switch controller, the DAC can be used in any devices to generate a first voltage output and a second voltage output that is offset from the first voltage output by a predetermined offset voltage.

The switch controller of the power converter may include a feedback voltage comparator and a knee voltage comparator. The feedback voltage comparator of the switch controller is coupled to the DAC for comparing the variable reference voltage to the sampled representation of the output voltage in the first switching cycle. The knee voltage comparator is coupled to the DAC for receiving and comparing the knee voltage to the sampled representation of the output voltage in the first switching cycle.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

Figure 1:
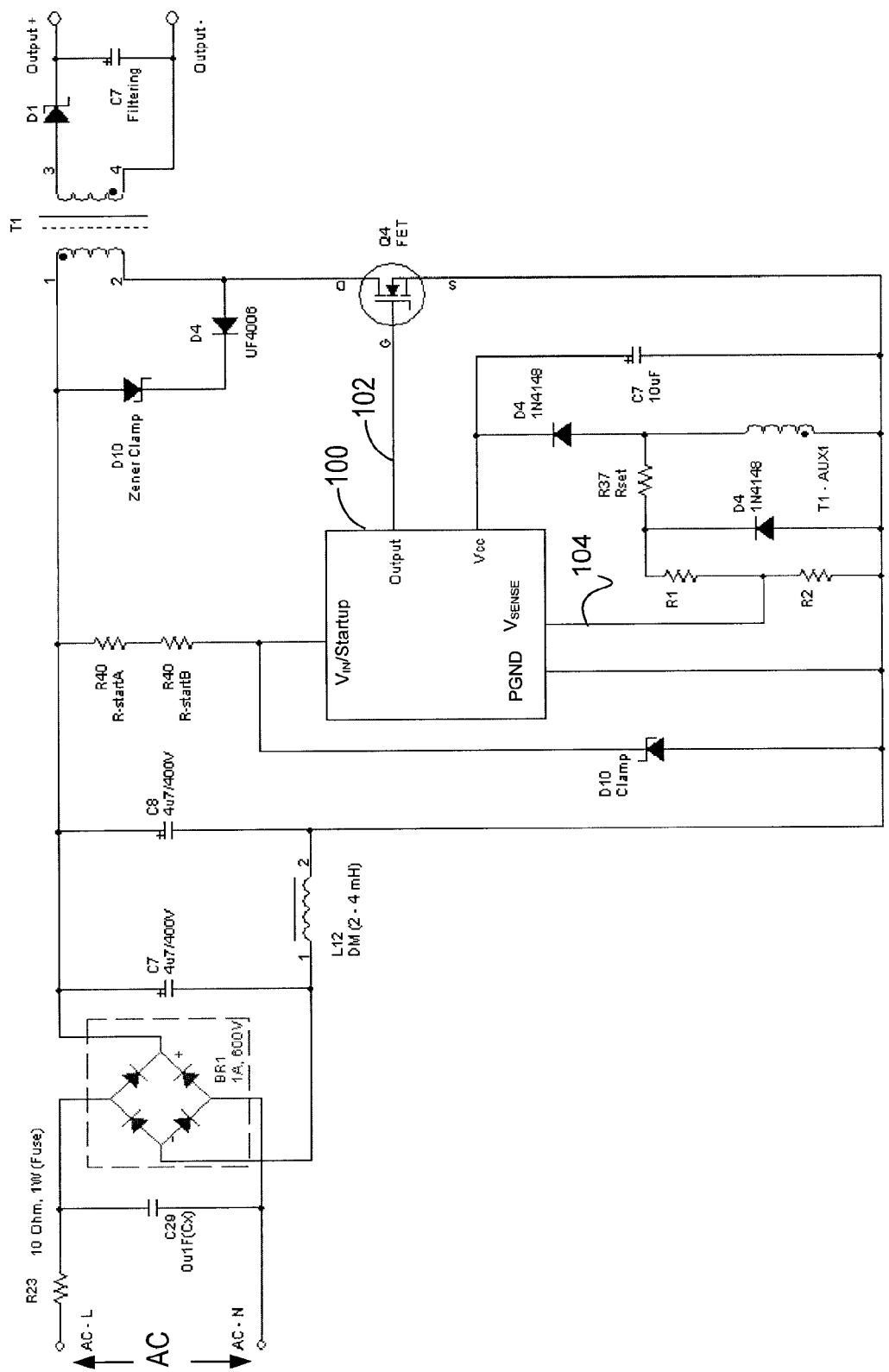
FIG. 1 is a diagram illustrating a power converter according to one embodiment of the present invention.

The embodiments of the present invention will be described below with reference to the accompanying drawings. Like reference numerals are used for like elements in the accompanying drawings.

FIG. 1 is a diagram illustrating a power converter according to an embodiment of the present invention. Although the power converter of FIG. 1 is a flyback converter with primary side sensing of the feedback signals, it should be noted that the present invention is not limited to a flyback converter and that it can be applied to any type of power converter of any topology. The power converter includes, among other components, a bridge rectifier BR1, a transformer T1, a switch Q4, an output rectifier diode D1, output filter capacitor C7, and a switch controller 100.

Referring to FIG. 1, the rectifier BR1 receives an input AC voltage and converts it into a full-wave rectified voltage for transfer to the output OUTPUT. The power converter controller 100 controls the opening and closing of the switch Q4 using its pulse signal 102 generated by the switch controller 100 in the form of a pulse with on-times ($T_{ON}$) and off-times ($T_{OFF}$). The output control signal 102 may be a periodic pulse with a fixed period, or a pulse with its period varying as necessary. When the switch Q4 is turned on because the pulse 102 is high during the on-time, energy is stored in the primary side windings of the transformer T1 because the diode D1 is reverse biased. When the switch Q4 is turned off, the energy stored in the primary windings of the transformer T1 is released to the secondary side of the transformer T1 because the diode D1 becomes forward biased. The diode D1 rectifies the output voltage on the secondary windings of the transformer T1 and the capacitor C7 filters the output voltage signal on the secondary windings of the transformer T1 for outputting as the output voltage OUTPUT.

Figure 2:
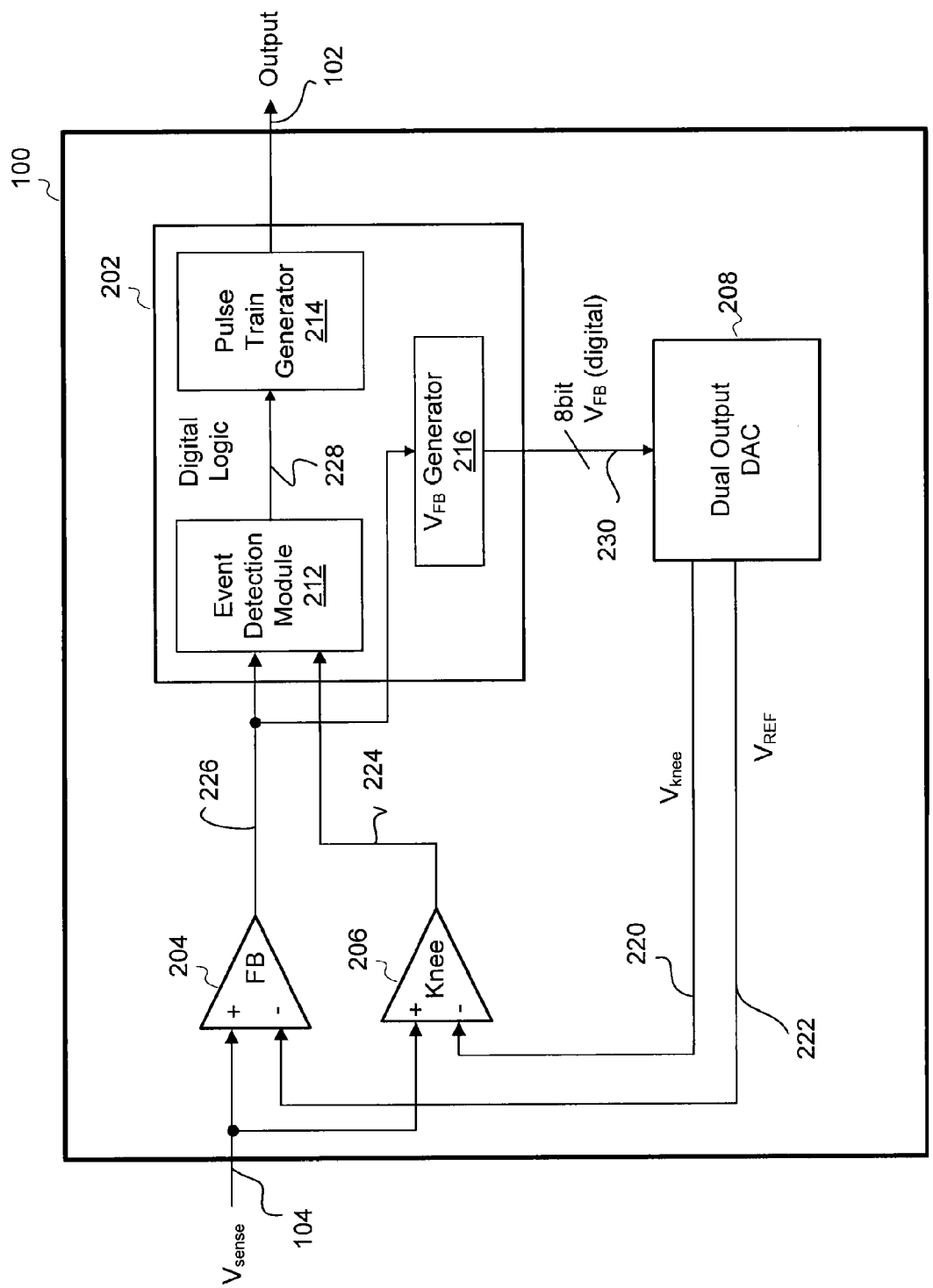
FIG. 2 is a block diagram illustrating a switch controller of the power converter according to one embodiment of the present invention.

FIG. 2 is a block diagram illustrating the switch controller 100 of the power converter. The switch controller 100 includes, among other components, a digital logic 202, a dual output digital-to-analog converter (DAC) 208, a feedback voltage comparator 204, and a knee voltage comparator 206. In an embodiment, the dual output DAC 208 is coupled to the digital logic 202 to receive an 8 bit digital signal $V_{FB}$ 230 representing a reconstructed output of the power converter in a previous switching cycle. The feedback voltage comparator 204 is coupled to the dual output DAC 208 to receive a variable reference voltage $V_{REF}$ 222. The knee voltage comparator 206 is coupled to the dual output DAC 208 to receive a knee voltage $V_{knee}$ 220. The feedback voltage comparator 204 outputs a feedback voltage comparator signal 226 to the digital logic 202. The knee voltage comparator 206 outputs a knee voltage comparator signal 224 to the digital logic 202.

The digital logic 102, among other components, includes an event detection module 212, a pulse train generator 214, and a $V_{FB}$ generator 216. The event detection module 212 receives a feedback voltage comparator signal 226 from the feedback voltage comparator 204, and a knee voltage comparator signal 224 from the knee voltage comparator 206. Based on inputs including, among other inputs, the feedback voltage comparator signal 226 and the knee voltage comparator signal 224, the event detection module 212 generates a digital flag signal 228. In one embodiment, the event detection module 212 detects events such as rise and drop of a scaled output voltage $V_{sense}$ 104 (sampled in a first switching cycle) against the variable reference voltage $V_{REF}$ 222 and the knee voltage 220, for example as described in U.S. Pat. No. 6,956,750 to Eason et al. entitled "Power Converter Controller Having Event Generator for Detection of Events and Generation of Digital Error," which is incorporated by reference herein. The pulse train generator 214 outputs the pulse signal 102 with on-times and off-times determined in response to the digital flag signal 228. The digital logic 202 can be implemented in any form of digital circuitry, including digital logic gates or a microprocessor with software embedded therein.

In the present invention, the variable reference voltage $V_{REF}$ 222 replaces the fixed reference voltage of conventional power converters. The variable reference voltage $V_{REF}$ 222 of the present invention is a variable voltage that is generated based on a reconstruction of output voltage of the power converter in a switching cycle prior to a second switching cycle (the switching cycle subsequent to the first switching cycle). The prior switching cycle can coincide with the first switching cycle at which the scaled output voltage $V_{sense}$ 104 of the power converter is sampled. Alternatively, the prior switching cycle is a switching cycle preceding the first switching cycle by one switching cycle.

The $V_{FB}$ generator 216 generates a digital feedback signal $V_{FB}$ 230 representing a reconstructed output voltage in the prior switching cycle. In one embodiment, the digital feedback signal can be generated by accumulating the feedback voltage comparator signal 226 (which is an error signal) in each switching cycle as described in, for example, U.S. Pat. No. 6,990,000 issued on Jan. 24, 2006 to Rodriguez et al., entitled "Reconstruction of the Output Voltage of an AC-DC Power Converter," which is incorporated by reference herein. The feedback comparator 204, the $V_{FB}$ generator 216, and the dual output DAC 208 of FIG. 2 corresponds respectively to and functions under the same principle as the comparator 510, the accumulator 502, and the D/A converter 506 described in the U.S. Pat. No. 6,990,000 to Rodriguez et al. Also, the feedback voltage comparator signal 226 and $V_{FB}$ 230 signal correspond respectively to $\Delta S(n)$ and $S(n)$, respectively, of U.S. Pat. No. 6,990,000 to Rodriguez et al.

The dual output DAC 208 receives the digital signal $V_{FB}$ 230 from the digital logic 202 via an internal bus of the switch controller 100 and generates the analog variable reference voltage $V_{REF}$ 222 and the knee voltage $V_{knee}$ 220. An embodiment of the dual output DAC 208 will be explained below in detail with reference to FIG. 3.

The feedback comparator 204 compares the scaled output voltage $V_{sense}$ 104 sensed in the first switching cycle to the variable reference voltage $V_{REF}$ 222. In response, the feedback comparator 204 generates a feedback comparator signal 226. The knee comparator 206 compares the output voltage $V_{sense}$ 104 sensed in the first switching cycle to the knee voltage $V_{knee}$ 220 and generates a knee comparator signal 224. Based on the feedback comparator signal 226 and the knee comparator signal 224, the digital logic 202 generates a pulse signal for the second switching cycle.

In the present invention, the knee voltage $V_{knee}$ 220 represents a voltage that is offset from the variable reference voltage $V_{REF}$ 222 by a predetermined fixed voltage $V_{offset}$ (i.e., $V_{knee} = V_{REF} - V_{offset}$). In one preferred embodiment, the predetermined fixed voltage $V_{offset}$ is set to be at least equal to or greater than the forward voltage drop in the diode D1 during the sample time offset as described in U.S. Pat. No. 6,956,750 to Eason et al. Contrary to the conventional power converters, the knee voltage $V_{knee}$ 220 varies in accordance with the variation in the variable reference voltage $V_{REF}$ 222. The significance and use of the variable reference voltage $V_{REF}$ 222 and the knee voltage $V_{knee}$ 220 will be explained below in detail with reference to FIG. 5.

The comparators 204 and 206 provide to the digital logic 202 signals 226, 224 indicating the rise and drop of the sensed output voltage $V_{sense}$ against the variable reference voltage $V_{REF}$ 222 and the knee voltage $V_{knee}$ 220 in a time domain. In an embodiment, the feedback voltage comparator 204 compares the scaled output voltage $V_{sense}$ sampled in the first switching cycle to the variable reference voltage $V_{REF}$ 222 and provides a high signal to the digital logic 202 when $V_{sense}$ 104 rises above the variable reference voltage $V_{REF}$ 222 and provides a low signal when $V_{sense}$ 104 is below the variable reference voltage $V_{REF}$ 222. Similarly, the knee voltage comparator 206 compares the sampled output voltage $V_{sense}$ 104 in the first switching cycle to the knee voltage $V_{knee}$ 220 and provides a high signal to the digital logic 202 when $V_{sense}$ 104 signal rises above the knee voltage $V_{knee}$ 220 in the first switching cycle. The knee voltage comparator 206 provides a low signal when $V_{sense}$ 104 is below the knee voltage $V_{knee}$ 220 in the first switching cycle. In another embodiment, the comparators 204 and 206 are replaced with differencer providing the event detection module 212 with a difference between $V_{sense}$ 104 and $V_{knee}$ 220 and a difference between $V_{sense}$ 104 and $V_{REF}$ 222.

Figure 3:
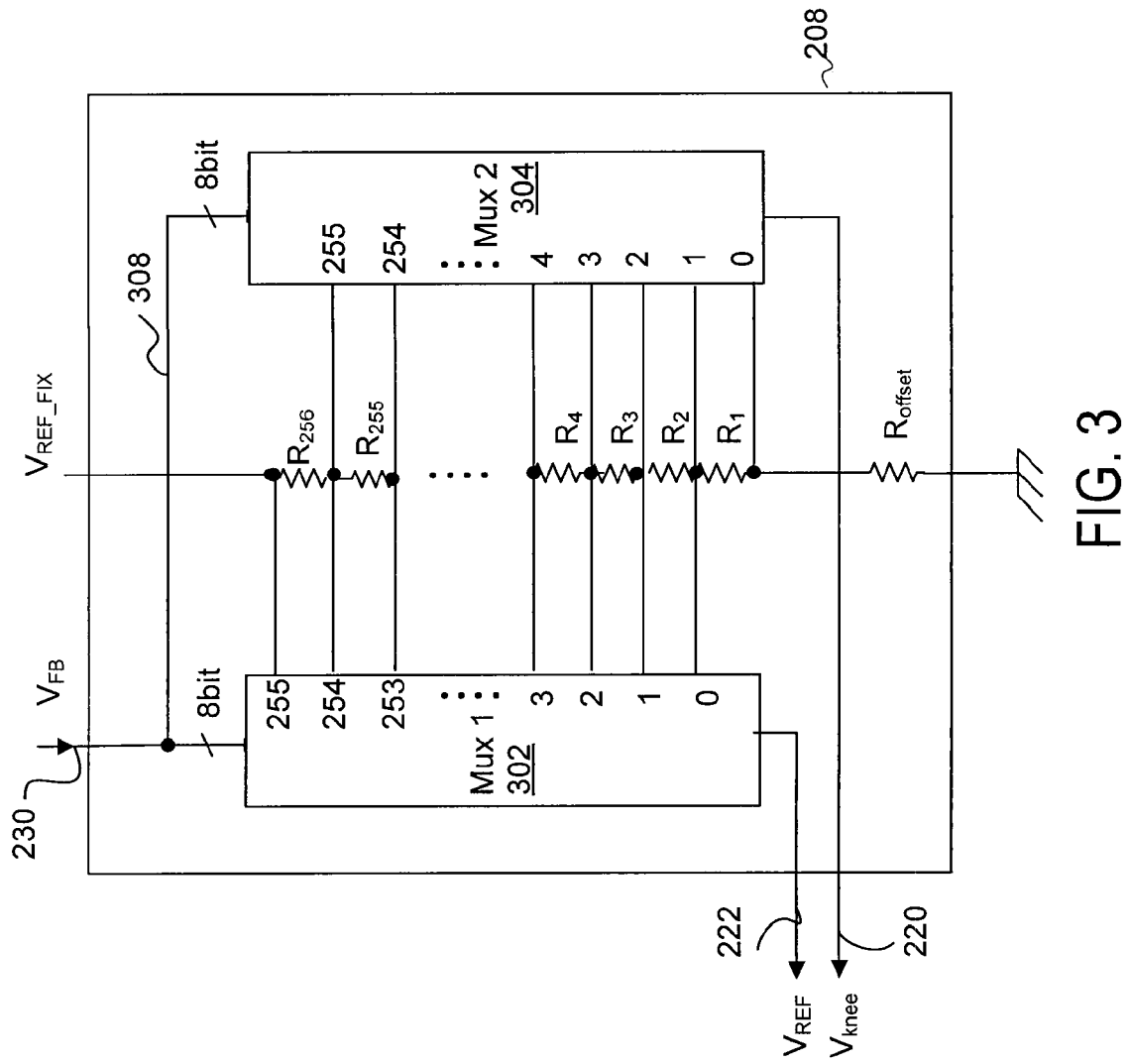
FIG. 3 is a schematic illustrating a digital-to-analog converter of the power converter according to one embodiment of the present invention.

Referring now to FIG. 3, an embodiment of the dual output DAC 208 is shown. The dual output DAC 208 includes, among other components, a first multiplexer 302, a second multiplexer 304, a string of resistors ($R_1, R_2, \ldots, R_{255}, R_{256}$) connected to each other in series, and an offset resistor $R_{offset}$. One end of the string of resistors is coupled to a fixed reference voltage $V_{REF\_FIX}$ and the other end is coupled to the offset resistor $R_{offset}$. Selection inputs of both multiplexers are coupled to the 8 bit bus from the $V_{FB}$ generator 216 of the digital logic 202. Signal inputs of both multiplexers are coupled to the string of resistors ($R_1, R_2, \ldots, R_{255}, R_{256}$). In one embodiment, all of the resistors in the string of resistors ($R_1, R_2, \ldots, R_{255}, R_{256}$) have the same resistance. A signal input (port 0) of the second multiplexer 304 is connected to the end of the string of resistors so that the voltage at the signal input (port 0) of the second multiplexer 304 is above ground by a voltage across the offset resistor $R_{offset}$. A signal input (port 1) of the second multiplexer 304 and a signal input (port 0) of the first multiplexer 302 are connected to a node between the resistors $R_{offset}$ and $R_1$ so that the voltage at these signal inputs is above ground by a voltage across the resistors $R_{offset}$ and $R_1$. A signal input (port 2) of the second multiplexer 304 and a signal input (port 1) of the first multiplexer 302 are connected to a node between resistors $R_2$ and $R_3$ so that the voltage at these signal inputs are above ground by a voltage across resistors $R_{offset}$, $R_1$ and $R_2$. The connections of the signal inputs (0, 1, ..., 254, 255) of the multiplexers 302 and 304 to the string of resistors ($R_1, R_2, \ldots, R_{255}, R_{256}$) can be generalized as follows: A signal input (port n) of the second multiplexer 304 and a signal input (port n−1) of the first multiplexer 302 are connected to a node between resistors $R_n$ and $R_{n+1}$ where n is an integer not less than 1 and not more than 255. The last signal input (port 255) of the first multiplexer 302 is connected to the fixed reference voltage $V_{REF\_FIX}$. The reconstructed output voltage $V_{FB}$ 230 causes the first multiplexer 302 and the second multiplexer 304 to select one of the signal inputs. The first multiplexer 302 outputs the variable reference voltage $V_{REF}$ 220 and the second multiplexer 304 outputs the knee voltage $V_{knee}$ 222. Offsetting the voltage at the end of the string of resistors to a level above ground makes the first signal input of the second multiplexer 304 less vulnerable to noises.

In one embodiment, the reconstructed output voltage $V_{FB}$ 230 causes the first multiplexer 302 and the second multiplexer 304 to select one of the signal inputs with port numbers corresponding to the decimal value of the feedback signal $V_{FB}$ 230. For example, when the $V_{FB}$ generator 216 outputs an 8 bit signal 00000000, the corresponding decimal value is zero. Therefore, both multiplexers 202 and 204 will select the signal inputs (port 0). In this example, the knee voltage $V_{knee}$ 222 from the second multiplexer 304 will be above ground by a voltage across the offset resistor $R_{offset}$ and the variable reference voltage 220 from the first multiplexer 302 will be above ground by a combined voltage across the resistors $R_1$ and $R_{offset}$. Therefore, the voltage difference between the variable reference voltage $V_{REF}$ 222 and the knee voltage $V_{knee}$ 220 is the voltage across a resistor ($R_1$). As another example, when $V_{FB}$ 230 is an 8 bit signal of 00100100 (=36), signal input (port 36) of both multiplexers 202 and 204 will be selected. Accordingly, the knee voltage $V_{knee}$ 220 from the second multiplexer 304 will be above ground by a combined voltage across 36 resistors ($R_1, R_2, \ldots, R_{36}$) and $R_{offset}$. The variable reference voltage $V_{REF}$ 222 from the first multiplexer 302 will be above ground by a combined voltage across 37 resistors ($R_1, R_2, \ldots, R_{37}$) and $R_{offset}$. Again, the voltage difference between the variable reference voltage $V_{REF}$ 222 and the knee voltage $V_{knee}$ 220 is the voltage across a resistor ($R_{37}$). It is to be understood that the relationship between the signal input number and the 8 bit signal is merely exemplary, and any other arrangements according to the design needs of the power converter can be implemented. Because the variable reference voltage $V_{REF}$ 220 and the knee voltage $V_{knee}$ 222 are adjusted from the reference voltage $V_{REF\_FIX}$ based on the digital signal $V_{FB}$ 230, the variable reference voltage $V_{REF}$ 220 and the knee voltage $V_{knee}$ 222 are variable and not fixed. Although an 8 bit implementation was used for $V_{FB}$ 230 signal and multiplexers 302 and 304 in this embodiment, other embodiments can use more or less bit resolutions (e.g., 4 bit or 32 bit).

Figure 4:
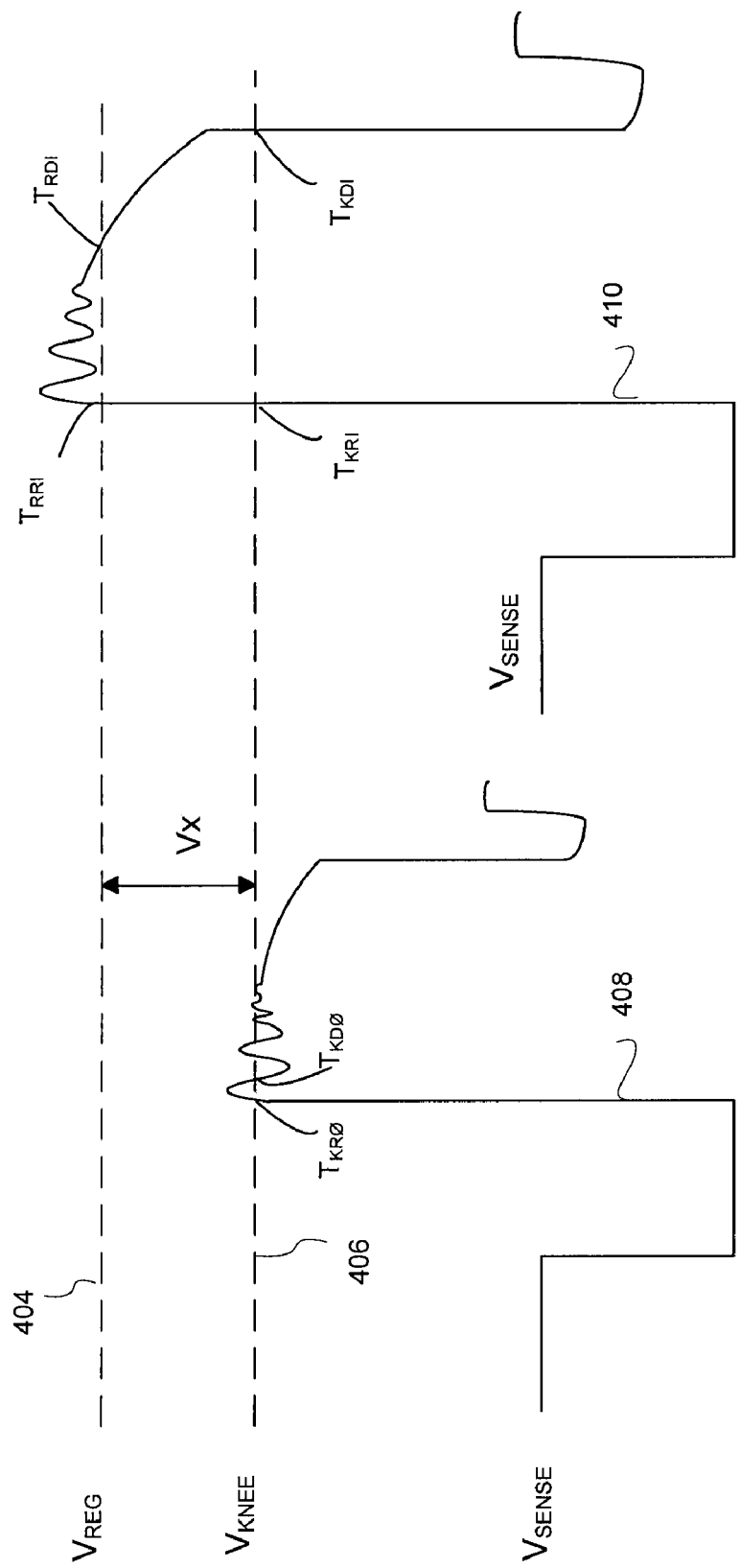
FIG. 4 is a diagram showing the waveforms of $V_{sense}$ in relation to a fixed reference voltage and a fixed knee voltage in a conventional power converter.
Figure 5:
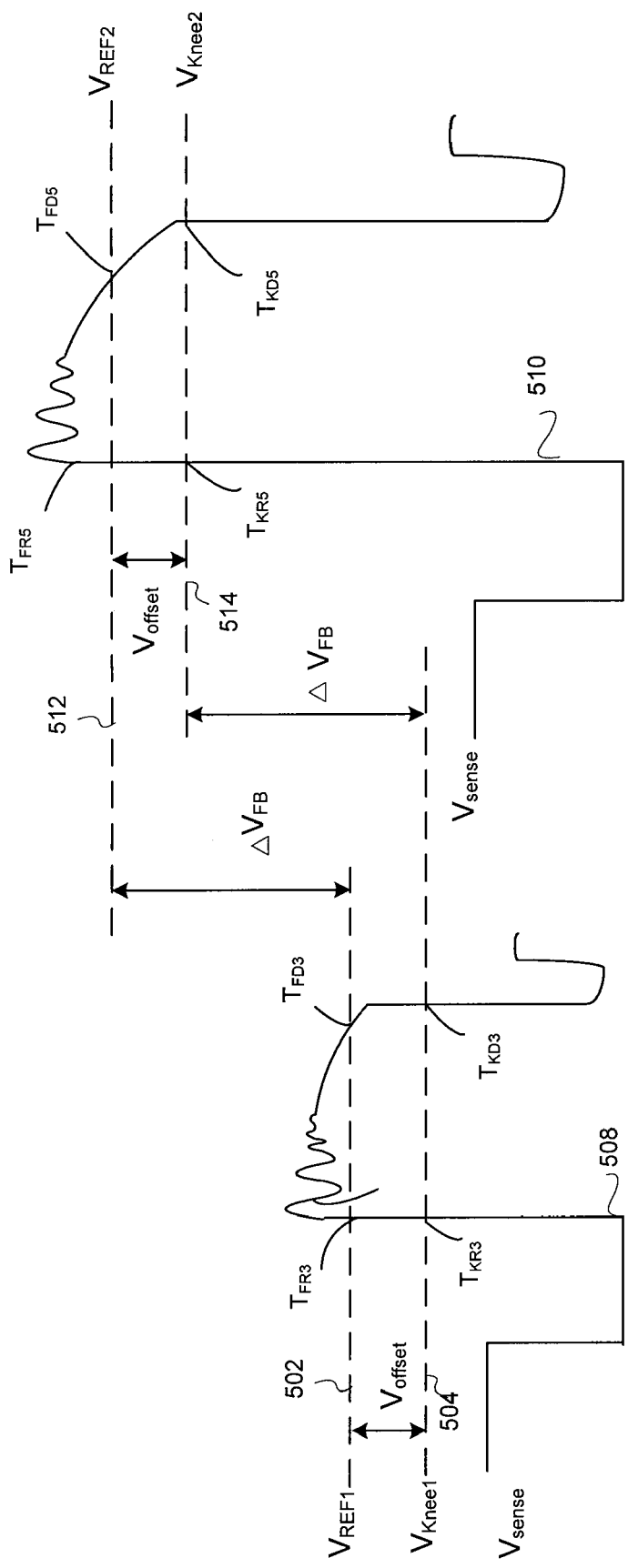
FIG. 5 is a diagram showing the waveforms of $V_{sense}$ in relation to a variable reference voltage and a variable knee voltage according to one embodiment of the present invention.

FIG. 5 illustrates the waveforms of $V_{sense}$ relative to the variable reference voltage and the variable knee voltage according to the present invention. The two waveforms 508 and 510 in FIG. 5 are exact duplicates of the waveforms 408 and 410 shown in FIG. 4. At the startup of the power converter or during under-regulation of the power converter, the variable reference voltage $V_{REF1}$ and the knee voltage $V_{knee1}$ are lowered because the $V_{FB}$ generator 216 will generate a digital signal $V_{FB}$ 230 representing a lower reconstructed output voltage, and the dual output DAC 208 will hence output a lowered variable reference voltage $V_{REF1}$ and a lowered knee voltage $V_{knee1}$. Therefore, the events of $V_{sense}$ 308 rising above the reference voltage $V_{REF1}$ at time $T_{FR3}$, $V_{sense}$ 308 rising above $V_{knee}$ at time $T_{KR3}$, $V_{sense}$ 308 dropping below the reference voltage $V_{REF1}$ at time $T_{FD3}$, and $V_{sense}$ 308 dropping below the knee voltage $V_{knee1}$ at time $T_{KD3}$ are all detected. In embodiments of the present invention, these four events are detected in a more extreme case of under-regulation where $V_{sense}$ fails to reach $V_{knee}$ of FIG. 4 because $V_{knee}$ and $V_{REF}$ will be lowered to corresponding levels of $V_{sense}$ in the prior switching cycle. When $V_{sense}$ rises to a level denoted by reference numeral 510, the reference voltage $V_{REF2}$ as well as the knee voltage $V_{knee2}$ is increased by $\Delta V_{FB}$ (thus, $\Delta V_{offset}$ remains the same). As can be seen from FIG. 5, the same four events are detected by the digital logic 102 at $T_{FR5}$, $T_{KR5}$, $T_{FD5}$, and $T_{KD5}$ despite the increase in $V_{sense}$. As can be derived from the above examples, the power converter of the present invention is more stable and robust because the variable reference voltage $V_{REF}$ and the knee voltage $V_{knee}$ are adjustable based upon changes in the $V_{sense}$ level. Moreover, the detected events more accurately represent the load condition of the power converter compared to conventional power converters using the fixed reference voltage and the fixed knee voltage.

Although the present invention has been described above with respect to several embodiments, various modifications can be made within the scope of the present invention. Accordingly, the disclosure of the present invention is intended to be illustrative, but not limiting, of the scope of the invention, which is set forth in the following claims.

What is claimed is:

1. A power converter comprising:
    a switch that electrically couples or decouples a load to or from a power source; and
    a switch controller coupled to the switch for controlling on-times and off-times of the switch, the switch controller including a digital logic generating a pulse signal for controlling on-times and off-times of the switch, the digital logic determining the pulse signal in a second switching cycle subsequent to a first switching cycle based on a difference between a representation of an output voltage in the first switching cycle and a variable reference voltage, the variable reference voltage being adjustable based on a fixed reference voltage and a reconstructed representation of the output voltage delivered to the load in a switching cycle prior to the second switching cycle, wherein the switch controller generates the pulse signal in the second switching cycle based further on a knee voltage representing a voltage offset from the variable reference voltage by a predetermined offset voltage.

2. The power converter of claim 1, wherein the digital logic comprises:
    a feedback voltage generator for accumulating a difference between the representation of the output voltage and the variable reference voltage in each switching cycle to generate the reconstructed representation of the output voltage.

3. The power converter of claim 1, wherein the switching cycle prior to the second switching cycle is a switching cycle preceding the first switching cycle by one switching cycle.

4. The power converter of claim 2, wherein the switch controller further includes a digital-to-analog converter coupled to the digital logic to receive the reconstructed representation of output voltage in the prior switching cycle, the digital-to-analog converter comprising:
    a string of resistors, each resistor having the same resistance, one end of the string of resistors coupled to a fixed reference voltage and the other end coupled to a voltage lower than the reference voltage;
    a first multiplexer coupled to the string of resistors, the first multiplexer including:
    selection inputs coupled to receive the reconstructed representation of the output voltage,
    signal inputs coupled to the string of resistors, and
    an output selected by the reconstructed representation of the output voltage to output the variable reference voltage adjustable based on the reconstructed representation of the output voltage in the prior switching cycle; and
    a second multiplexer coupled to the string of resistors, the second multiplexer including:
    selection inputs coupled to receive the reconstructed representation of the output voltage,
    signal inputs coupled to the string of resistors, and
    an output of the second multiplexer selected based on the reconstructed representation of the output voltage in the prior switching cycle to output the knee voltage with the predetermined offset voltage being a voltage drop across one of the string of resistors.

5. The power converter of claim 4, wherein a signal input (port 0) of the second multiplexer is coupled to the other end of the string of resistors, a signal input (port n−1) of the first multiplexer and a signal input (port n) of the second multiplexer are coupled to a node of the string of resistors where a voltage is above said other end of the string of resistors by a voltage across n resistors (where n is an integer not less than one) of the string of resistors, and a last signal input of the first multiplexer is coupled to said one end of the string of resistors.

6. The power converter of claim 1, wherein the power converter is a primary side sensing flyback power converter and includes a transformer coupled between the switch and the load and having a primary winding coupled to the switch, a secondary winding coupled to the load, and an auxiliary winding coupled to the switch controller, the predetermined offset voltage corresponding to a forward voltage drop of a diode coupled between the secondary winding and the load as reflected on the auxiliary winding.

7. The power converter of claim 1, wherein the switch controller further comprises:
   a feedback voltage comparator coupled to the digital-to-analog converter for comparing the variable reference voltage to the representation of the output voltage sampled in the first switching cycle; and
   a knee voltage comparator coupled to the digital-to-analog converter for comparing the knee voltage to the representation of the output voltage sampled in the first switching cycle.

8. A switch controller controlling on-times and off-times of a switch that electrically couples or decouples a load to or from a power source in an AC-to-DC power converter, the controller comprising:
   a digital logic generating a pulse signal for controlling on-times and off-times of the switch, the digital logic determining the pulse signal in a second switching cycle subsequent to a first switching cycle based on a difference between a representation of an output voltage in the first switching cycle and a variable reference voltage, the variable reference voltage being adjustable based on a fixed reference voltage and a reconstructed representation of the output voltage delivered to the load in a switching cycle prior to the second switching cycle, wherein the switch controller generates the pulse signal in the second switching cycle based further on a knee voltage representing a voltage offset from the variable reference voltage by a predetermined offset voltage.

9. The switch controller of claim 8, wherein the digital logic comprises:
   a feedback voltage generator for accumulating a difference between the representation of the output voltage and the variable reference voltage in each switching cycle to generate the reconstructed representation of the output voltage.

10. The switch controller of claim 8, wherein the switching cycle prior to the second switching cycle is a switching cycle preceding the first switching cycle by one switching cycle.

11. The switch controller of claim 9, wherein the switch controller further includes a digital-to-analog converter coupled to the digital logic to receive the reconstructed representation of output voltage in the prior switching cycle, the digital-to-analog converter comprising:
   a string of resistors, each resistor having the same resistance, one end of the string of resistors coupled to a reference voltage and the other end couple to a voltage lower than the reference voltage;
   a first multiplexer coupled to the string of resistors, the first multiplexer including:
      selection inputs coupled to the reconstructed representation of the output voltage,
      signal inputs coupled to the string of resistors, and
      an output selected by the reconstructed representation of the output voltage to output the variable reference voltage adjustable based on the reconstructed representation of output voltage in the prior switching cycle; and
   a second multiplexer coupled to the string of resistors, the second multiplexer including:
      selection inputs coupled to receive the reconstructed representation of the output voltage,
      signal inputs coupled to the string of resistors, and
      an output of the second multiplexer selected based on the reconstructed representation of the output voltage in the prior switching cycle to output the knee voltage with the predetermined offset voltage being a voltage drop across one of the string of resistors.

12. The power converter of claim 11, wherein a signal input (port 0) of the second multiplexer is coupled to the other end of the string of resistors, a signal input (port n−1) of the first multiplexer and a signal input (port n) of the second multiplexer are coupled to a node of the string of resistors where a voltage is above said other end of the string of resistors by a voltage across n resistors (where n is an integer not less than one) of the string of resistors, and a last signal input of the first multiplexer is coupled to said one end of the string of resistors.

13. The switch controller of claim 8, wherein the switch controller further comprises:
   a feedback voltage comparator coupled to the digital-to-analog converter for comparing the variable reference voltage to the representation of the output voltage sampled in the first switching cycle; and
   a knee voltage comparator coupled to the digital-to-analog converter for comparing the knee voltage to the representation of the output voltage sampled in the first switching cycle.

14. A switch controller controlling on-times and off-times of a switch that electrically couples or decouples a load to or from a power source in an AC-to-DC power converter, the switch controller comprising:
   a digital logic generating a pulse signal for controlling an on-time and an off-time of the switch in a second switching cycle subsequent to a first switching cycle, the digital logic generating a digital representation of a reconstructed output voltage delivered to the load in a switching cycle prior to the second switching cycle;
   a digital-to-analog converter coupled to the digital logic for receiving the digital representation of the reconstructed voltage in the prior switching cycle and generating the variable reference voltage based on the digital representation of the reconstructed output voltage, the digital-to-analog converter further generating a knee voltage offset from the variable reference voltage by a predetermined offset voltage;
   a feedback voltage comparator coupled to the digital-to-analog converter for receiving the variable reference voltage, the feedback voltage comparator comparing the representation of output voltage sampled in the first switching cycle to the variable reference voltage to generate a feedback voltage comparator signal sent to the digital logic; and
   a knee voltage comparator coupled to the digital-to-analog converter for receiving the knee voltage, the knee voltage comparator comparing the representation of output voltage sampled in the first switching cycle to the knee voltage to generate a knee voltage comparator signal.

15. The switch controller of claim 14, wherein the digital logic comprises:
   a feedback voltage generator for accumulating a difference between the representation of the output voltage and the variable reference voltage in each switching cycle to generate the reconstructed representation of the output voltage.

16. A method of controlling on times and off-times of a switch that electrically couples or decouples a load to or from a power source in a power converter, the method comprising:

reconstructing a representation of an output voltage in a switching cycle prior to a second switching cycle subsequent to a first switching cycle; and generating a pulse signal in the second switching cycle controlling on-times and off-times of the switch based on a difference between a representation of the output voltage in the first switching cycle and a variable reference voltage, the variable reference voltage being adjustable based on a fixed reference voltage and a reconstructed representation of the output voltage delivered to the load in the prior switching cycle, and wherein generating the pulse signal in the second switching cycle comprises:

generating the variable reference voltage based on the reconstructed representation of the output voltage delivered to the load in the prior switching cycle;

comparing the variable reference voltage to the representation of output voltage sampled in the first switching cycle to generate a signal indicating rising and falling of the representation of output voltage against the variable reference voltage; and generating the pulse signal in the second switching cycle based on the signal indicating rising and falling of the representation of output voltage against the variable reference voltage in the first switching cycle.

17. The method of claim 16, where generating the pulse signal in the second switching cycle further comprises:

generating a knee voltage representing a voltage offset from the variable reference voltage in the prior switching cycle by a predetermined offset voltage; and comparing the knee voltage to the representation of the output voltage sampled in the first switching cycle to generate a signal indicating rising and falling of the representation of output voltage against the knee voltage, wherein generating the pulse signal in the second switching cycle is further based on the signal indicating rising and falling of the representation of the output voltage in the first switching cycle against the knee voltage.

18. A dual output multiplexer comprising:
a string of resistors;
a first multiplexer coupled to one end of the string of resistors; and
a second multiplexer coupled to the string of resistors and the first multiplexer;
wherein selection inputs of both the first and the second multiplexers receive a digital signal, signal inputs of the multiplexers are coupled to the string of resistors so that a difference between output voltages of the first and the second multiplexers is offset by a predetermined offset voltage, a signal input (port 0) of the second multiplexer is coupled to the other end of the string of resistors, a signal input (port n−1) of the first multiplexer and a signal input (port n) of the second multiplexer are coupled to a node of the string of resistors where a voltage is above said other end of the string of resistors by a voltage across n resistors (where n is an integer not less than one) of the string of resistors, and a last signal input of the first multiplexer is coupled to said one end of the string of resistors.

19. The dual output multiplexer of claim 18, wherein the dual output multiplexer is used in a power converter.

20. A power converter comprising:
a switch that electrically couples or decouples a load to or from a power source; and
a switch controller coupled to the switch for controlling on-times and off-times of the switch, the switch controller generating a pulse signal for controlling on-times and off-times of the switch in a second switching cycle subsequent to a first switching cycle based on a difference between a representation of an output voltage in the first switching cycle and a variable reference voltage, the variable reference voltage adjustable based on a fixed reference voltage and a reconstructed representation of output voltage delivered to the load in a switching cycle prior to the second switching cycle, wherein the switch controller generates the pulse signal in the second switching cycle based further on a knee voltage representing a voltage offset from the variable reference voltage by a predetermined offset voltage.

* * * * *